(12) United States Patent
Karr (10) Patent No.: US 6,970,465 B2
(45) Date of Patent: Nov. 29, 2005

(54) SYSTEM AND METHOD FOR LOCATING A DATA FRAME WITHIN A TRANSMITTED DATA STREAM

(75) Inventor: Lawrence J. Karr, Santa Monica, CA (US)

(73) Assignee: Microsoft Corporation, Redmond, WA (US)

( * ) Notice: Subject to any disclaimer, the term of this patent is extended or adjusted under 35 U.S.C. 154(b) by 958 days.

(21) Appl. No.: 10/046,653

(22) Filed: Oct. 26, 2001

(65) Prior Publication Data

US 2003/0083083 A1    May 1, 2003

(51) Int. Cl.[7] ............................................. H04L 12/28
(52) U.S. Cl. ...................... 370/394; 370/514; 370/515; 370/474
(58) Field of Search ................................ 370/349, 389, 370/392, 394, 338, 474, 503, 509, 510, 512, 370/513, 514, 515; 375/354, 368, 365; 714/746, 714/748, 749, 750

(56) References Cited

U.S. PATENT DOCUMENTS

| | | | |
|---|---|---|---|
| 4,665,519 A | 5/1987 | Kirchner et al. | 370/94 |
| 4,761,796 A | 8/1988 | Dunn et al. | 375/1 |
| 4,910,511 A | 3/1990 | Nagata et al. | 340/825 |
| 5,038,405 A | 8/1991 | Karr | 455/197 |
| 5,046,066 A | 9/1991 | Messenger | 370/94.1 |
| 5,136,719 A | 8/1992 | Gaskill et al. | 455/193.1 |
| 5,243,356 A | 9/1993 | Hama | 343/718 |
| 5,301,358 A | 4/1994 | Gaskill et al. | 455/56.1 |
| 5,732,333 A | 3/1998 | Cox et al. | 455/126 |
| 5,757,782 A | 5/1998 | Gaskill | 370/313 |
| 5,854,985 A | 12/1998 | Sainton et al. | 455/553 |
| 5,884,140 A | 3/1999 | Ishizaki et al. | 455/2 |
| 5,928,322 A | 7/1999 | Bitar et al. | 709/4 |
| 5,974,034 A | 10/1999 | Chin et al. | 370/328 |
| 6,012,159 A | 1/2000 | Fischer et al. | 714/755 |
| 6,111,896 A | 8/2000 | Slattery et al. | 370/535 |
| 6,804,257 B1 * | 10/2004 | Benayoun et al. | 370/471 |
| 2002/0031126 A1 * | 3/2002 | Crichton et al. | 370/394 |
| 2003/0076810 A1 * | 4/2003 | Rezaiifar et al. | 370/349 |
| 2003/0128704 A1 * | 7/2003 | Mizrachi et al. | 370/394 |

FOREIGN PATENT DOCUMENTS

WO    WO 00/28680    3/2000

OTHER PUBLICATIONS

Gasgill et al., "High Speed Subcarrier Data System (HSDS)," *Seiko Communications*, Sep. 21, 1993, 14 pgs.

* cited by examiner

*Primary Examiner*—Ajit Patel
(74) *Attorney, Agent, or Firm*—Merchant & Gould P.C.

(57) ABSTRACT

Described is a system and method related to the synchronization of a communication stream between two devices. A broadcast signal is a segmented information signal that includes a distributed synchronization pattern and a distributed frame index. Each segment of the segmented information signal further includes a header portion and a payload portion. The header portion of the segmented information signal includes a portion of the distributed synchronization pattern and a portion of the distributed frame index. The method includes generating the distributed synchronization pattern and the distributed frame index, distributing the synchronization pattern and frame index throughout the signal, and transmitting the signal.

23 Claims, 4 Drawing Sheets

SYSTEM AND METHOD FOR LOCATING A DATA FRAME WITHIN A TRANSMITTED DATA STREAM

FIELD OF THE INVENTION

The present invention relates generally to data communications, and more particularly to identifying a received data frame within a data stream.

BACKGROUND OF THE INVENTION

Consumer electronics of almost any size now include controllers or processors and perform many functions that used to be exclusively within the domain of the desktop computer. One category of such devices, mobile devices, previously dedicated to receiving limited data such as alphanumeric paging, is now being utilized to receive other data in addition to alphanumeric paging. Some mobile devices now allow users to connect to the Internet and browse web sites; other mobile devices now allow users to check and send email. Those devices, and other devices, receive data asynchronously that is transmitted over a wireless communications link. To ensure proper reception of that data, the system should provide some mechanism for identifying what data has been received.

In other words, when transmitting data, a transmitting entity generally transmits a stream of data to a receiving entity. If the receiving entity begins receiving the data at some point other than at the beginning of the stream, the receiving entity should be able to identify what portion of the stream has been received. Often, if the receiving entity and the transmitting entity use different clocks, identifying exactly what portion of the stream has been received is difficult. One solution to this problem is to simply not support the reception of anything less than the entire stream. This is less than a desirable solution. However, an efficient and usable solution to this problem has eluded those skilled in the art.

SUMMARY OF THE INVENTION

This summary of the invention section is intended to introduce the reader to aspects of the invention and is not a complete description of the invention. Particular aspects of the invention are pointed out in other sections herein below and the invention is set forth in the appended claims, which alone demarcate its scope.

The present invention is related to a system and method for locating a data frame within a transmitted data stream. More specifically, the invention is directed at a system and method for receiving a portion of a segmented data stream and determining the location within the data stream of the received portion.

Briefly stated, the invention provides a system and method for transmitting a segmented stream of data, wherein a synchronization pattern is distributed over a predetermined number of segments within the stream of data. For example, the synchronization pattern may be distributed over a frame of 16 segments, and repeated for every 16-segment frame within the stream. A different frame index may be assigned to each frame. Each frame index is then distributed over the segments within the respective frame. As segments are received, a receiver collects each part of the distributed synchronization pattern from the received segments, and correlates the synchronization pattern with a locally stored synchronization pattern. A proper correlation results in a peak signal, indicating to the receiver where the beginning and end of the frame are. Once that information is determined, the receiver recombines the frame index to identify which frame within the stream of data has been received.

In one aspect, a system for providing a synchronization pattern includes a broadcast transmitter, a receiving device, and a broadcast signal. The broadcast transmitter is configured to transmit the broadcast signal on a predetermined schedule. The receiving device includes a receiver configured to receive the broadcast signal. The broadcast signal includes a segmented information signal wherein a synchronization pattern is distributed over a number of segments, and a frame index is distributed over those segments. The distributed synchronization pattern is used to identify a frame of segments, and the frame index is used to identify which frame has been received.

In another aspect, a method for providing a synchronization pattern system includes the steps of generating a synchronization pattern, distributing the synchronization pattern over a segmented information signal, generating a segmented index, distributing the segmented index, and transmitting the segmented information signal over a transmission medium. In this aspect, distributing the distributed synchronization pattern defines boundaries between groups of segments in the segmented information signal. The step of distributing the segmented index is accomplished by distributing the segmented index over a particular group of segments in the segmented information signal, wherein the segmented index distinguishes the particular group of segments from other groups of segments.

In yet another aspect, a method for communication stream synchronization in a communications receiver includes the steps of receiving a segmented information signal, collecting a distributed synchronization pattern from the segmented information signal, collecting a distributed frame index from the segmented information signal, correlating the collected distributed synchronization pattern with a known synchronization pattern, and evaluating the collected distributed frame index. The step of correlating the collected distributed synchronization pattern includes correlating the collected distributed synchronization pattern with a known synchronization pattern to define boundaries for groups of segments in the segmented information signal. The step of evaluating the collected distributed segment index identifies which group of the groups of segments in the segmented information signal has been received.

DETAILED DESCRIPTION OF THE PREFERRED EMBODIMENT

The present invention is related to a system and method for locating a data frame within a transmitted data stream. Among other things, disclosed is a protocol designed to receive a portion of a segmented data stream and determine the location in the segmented data stream of the received portion.

Illustrative Operating Environment

Figure 1:
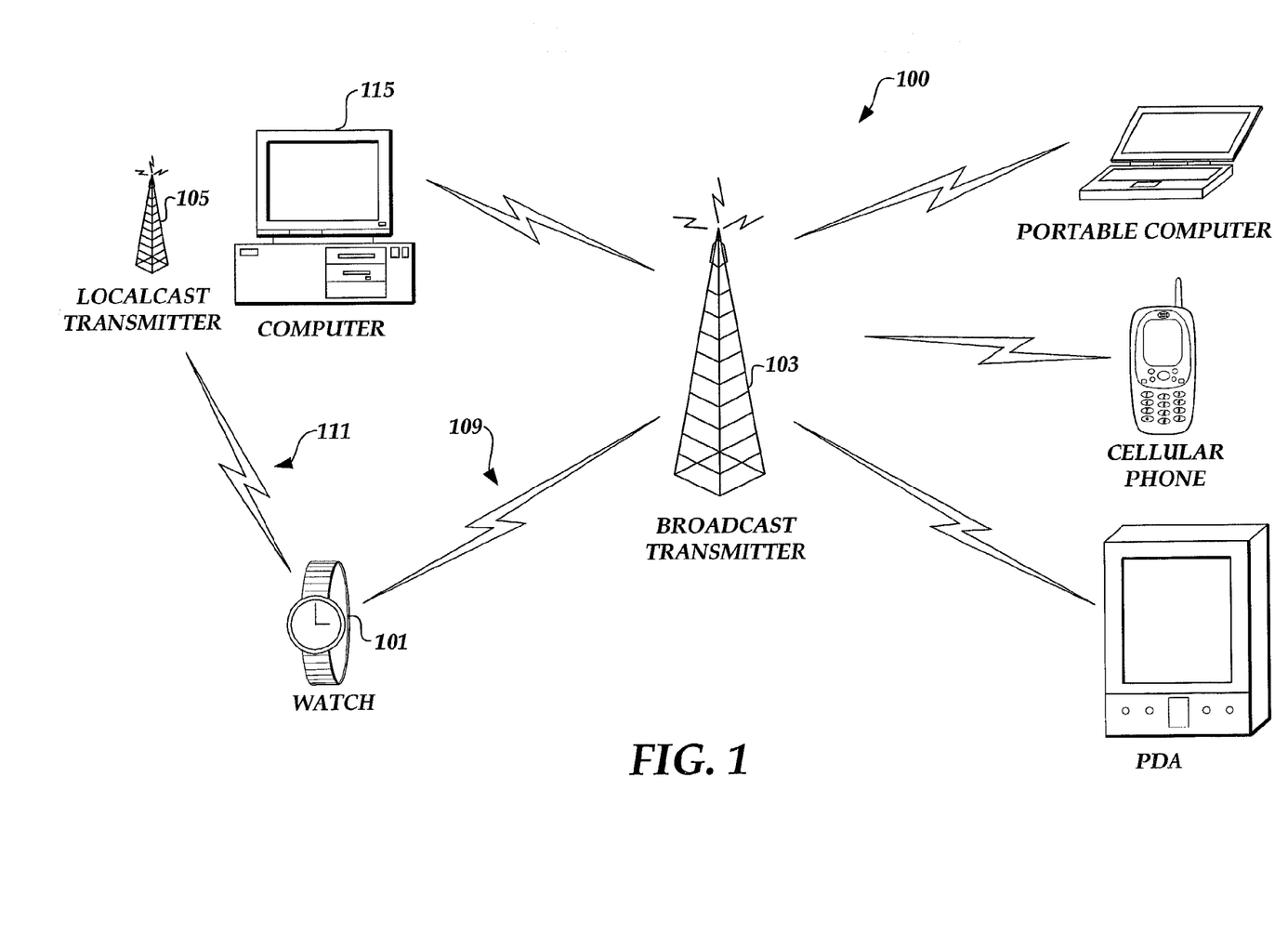
FIG. 1 is a functional block diagram of a sample communication environment in which the present invention may be implemented.

FIG. 1 is a functional block diagram of a sample communication system 100 that benefits from the teachings of the present invention. The disclosed communication system 100 includes three main operating components: a watch 101, a broadcast transmitter 103, and a localcast transmitter 105. As is illustrated in FIG. 1, the broadcast transmitter 103 transmits broadcast signals (e.g., broadcast signal 109), over FM subcarriers to a number of mobile or fixed devices, including the watch 101 and a computer 115. The computer 115 may be attached to the localcast transmitter 105 and transmits localcast signals (e.g., localcast signal 111) to mobile devices in the immediate vicinity of the computer 115. The localcast transmitter 105 may also be configured to connect directly to the Internet through, for example, an Ethernet connection. The watch 101 is described in greater detail below in conjunction with FIG. 2.

The normal operation of the watch 101 is receiving data broadcast via FM subcarrier (e.g., broadcast signal 109). A local direct FM "localcast" receiving mode is also available (e.g., localcast signal 111). Watches may also be set to communicate with nearby watches, other mobile devices, or even fixed computer systems, one-on-one, in a half-duplex two-way messaging mode.

Although described here in the context of a watch-based mobile system, it will be apparent that the teachings of the application have equal applicability to any communication system whether mobile or otherwise. For example, the teachings of the present invention may have equal applicability in wired systems for data transmission between two components, such as between portable computers, personal digital assistants (PDAs), cellular telephones, and the like. Moreover, the teachings of the present invention have applicability to data transmissions between two or more subcomponents of any of those components, such as between a hard disk controller and a system bus controller, or the like. The use of a watch is for illustrative purposes only to simplify the following discussion.

Figure 2:
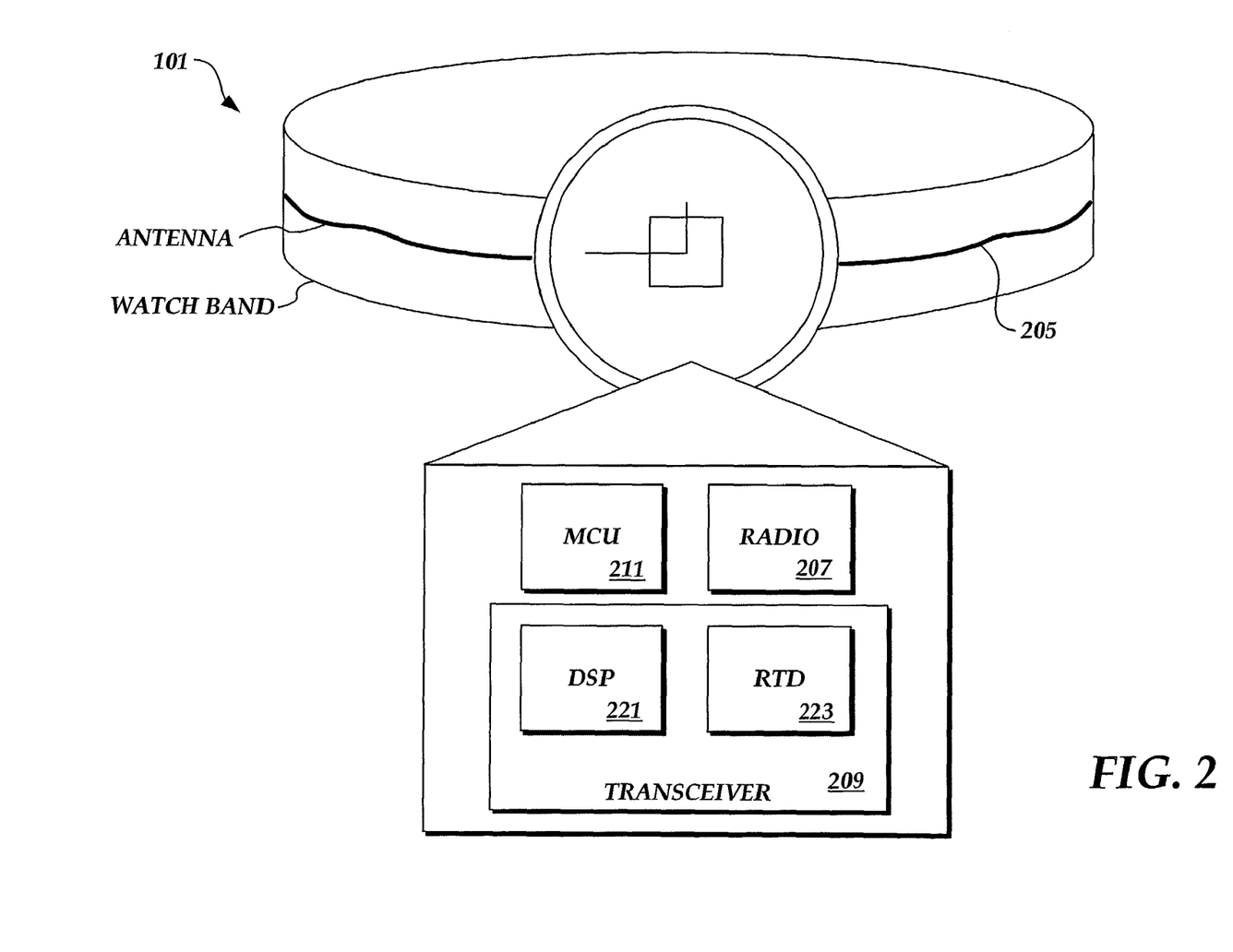
FIG. 2 is a functional block diagram illustrating one implementation of the invention in a wrist-worn mobile device, such as a watch.

FIG. 2 illustrates an example of an operating environment in which the invention may be implemented as a mobile device, for example, a watch (101). In this example, the watch 101 is composed of four sub-components: a watchband antenna 205, an analog radio 207, a digital transceiver 209, and a Microcomputer assembly (the "MCU") 211. In this embodiment, the antenna 205 includes a watchband loop antenna and discrete analog tuning elements. The antenna 205 may be a conducting loop embedded in the watchstrap.

The watchband antenna 205 connects to, and is controlled by, the transceiver 209. The MCU 211 controls may include running an operating system, an application, a presentation, a connection, and data selection activities, as well as to drive the user I/O devices at the physical level. The MCU 211 interfaces to other components of watch 101 through the transceiver 209.

The transceiver 209 further includes a digital signal processor (DSP) 221 and a real time device (RTD) 223. The digital signal processor (DSP) 221 performs control, scheduling and post-processing tasks for the transceiver. The real time device (RTD) 223 further includes a digital radio, system timing, and real-time event dispatching.

In one example, the MCU 211 may be instructed (through user interaction or control) to retrieve selected data, which is known to be broadcast over the communications network. The broadcast signal (see FIG. 1) may be constantly transmitted as a lengthy stream of data. The MCU 211, using the mechanisms and technique described below, determines where within the stream of data a particular received portion lies. Generally stated, the stream of data is segmented and a frame index is distributed among multiple segments. By receiving at least a number of segments great enough to recombine the distributed frame index, the receiving station (e.g., watch 101) can identify which segments within the stream have been received.

The operating environment shown in FIG. 2 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

Illustrative Communication Stream Synchronization Scheme

FIGS. 3–6 illustrate an example of a data format for communications according to one embodiment of the present invention. The disclosed embodiment is but one illustrative format, and alternatives that fall within the spirit and scope of the invention will become readily apparent from the teachings of the present invention to those skilled in the art.

Figure 3:
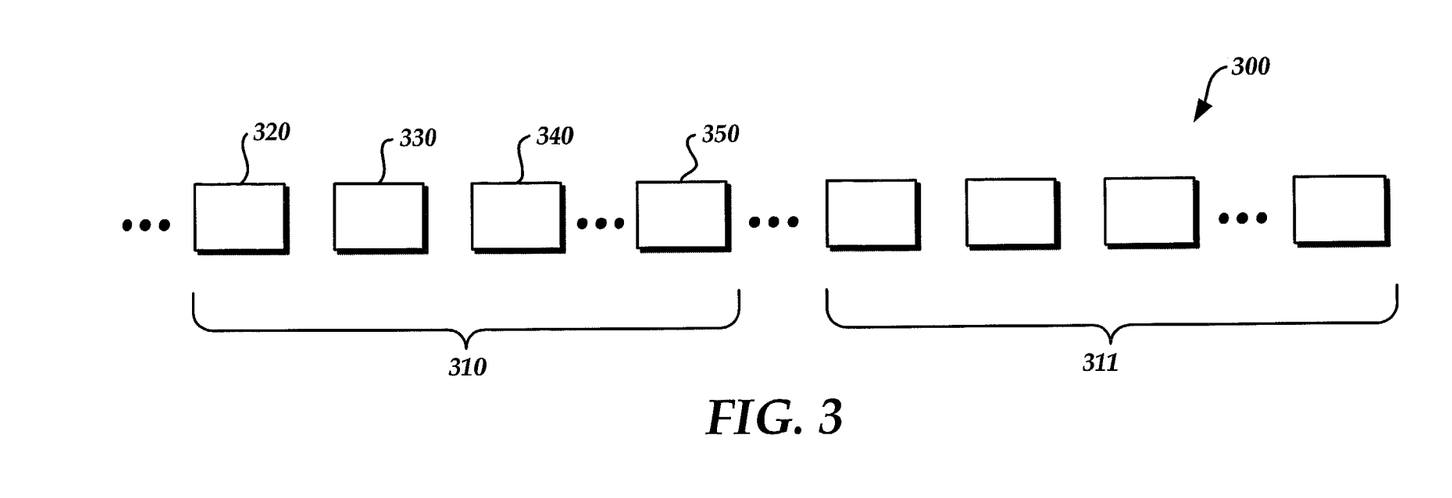
FIG. 3 is a graphical representation of a data construct or format for transmissions by a communications system implementing one embodiment of the present invention.

FIG. 3 is a graphical representation of a data construct or format for transmissions by a communications system implementing the present invention. In FIG. 3, data stream 300 includes one or more frames (310–31n). Each frame (310–31n) includes one or more segments (320–350). In one example, data stream 300 may be composed of 20,480 segments, with each segment including a portion of data and a 4-symbol header.

The frame is the basic partition in the data stream 300. In one embodiment, successive frames are assigned sequential numbers, with the enumeration being reset daily. In one example, the first frame might start after midnight and be identified as "Frame Zero."

In accordance with the invention, each frame number or "frame index" is distributed among the several segments in the respective frame so that the frames within the data stream 300 are uniquely identifiable rather than each individual segment. The division of frames is further discussed in detail in FIG. 5. The format of an embodiment of a segment of the distributed frame index is illustrated in detail in conjunction with FIG. 4.

Figure 4:
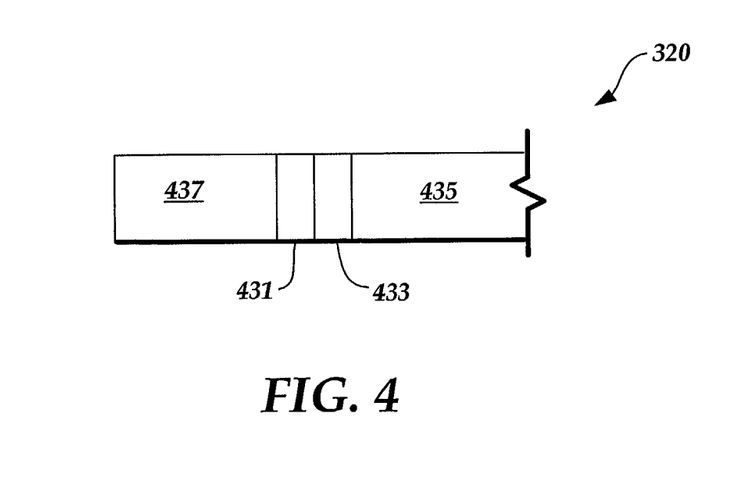
FIG. 4 is another graphical representation of a data construct or format for a data segment according to one embodiment of the present invention.

As illustrated in FIG. 4, each segment 320 contains a number of data bits, including synchronization information for the digital signal processing process. In one embodiment, the received segments are reassembled into packets by receiver hardware, and analyzed shortly after the last segment is received. Each segment 320 further includes a synchronization bit 431, a frame index bit 433, additional data bits 435, and timing marker bits 437.

In this example, the first 3 symbols (timing marker bits 437) of the header are a fixed pattern that marks the start of a segment. The fixed pattern is used for timing recovery. The fourth symbol then contains bits 431 and 433. The first bit of the fourth symbol, synchronization bit 431, is one bit of a distributed synchronization pattern, such as a 15-bit linear feedback shift register pattern (LFSR) (padded to 16-bits) distributed over 16-segments. See FIG. 5 and its associated text for a discussion of the use of the synchronization bit 431. The final bit of the fourth symbol is the frame index bit 433 which is described below in conjunction with FIG. 6.

Figure 5:
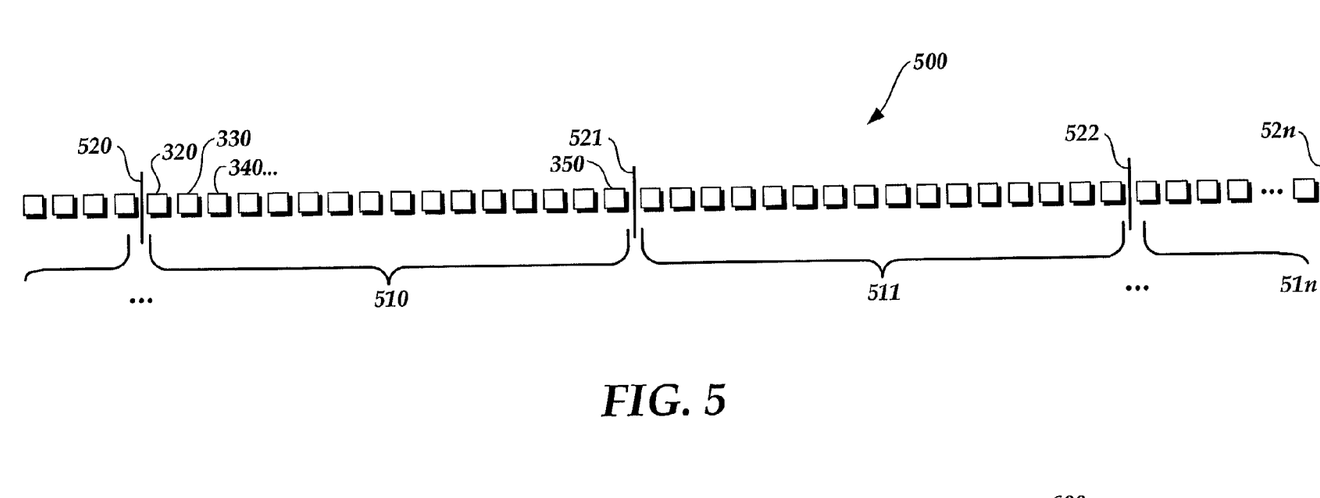
FIG. 5 is yet another graphical representation of a data construct or format for a data frame according to one embodiment of the present invention.

FIG. 5 is another graphical representation of a data construct or format for transmissions by a communications system implementing one embodiment of the present invention. In FIG. 5, data stream 500 includes frames (510–51n) where each frame 510, 511, 512 is delineated by a frame boundary (520, 521, 522). Each frame includes a predetermined number of segments (320–350), 16 in this example. Each segment (320–350) includes a synchronization bit 431, as mentioned above, that includes one bit of a distributed synchronization pattern. One example of such a distributed synchronization pattern is a 15-bit LFSR pattern with one pad bit (16 total bits) distributed over a 16-segment frame, and repeated for each frame in the data stream 500.

While a variety of binary bit patterns may be employed for the synchronization pattern, it is desirable to generate a pattern that has good randomness properties. That is, a synchronization pattern of length N should have a correlation function with the property that $F(0) \approx N$, and $F(j)=|1/N|$, for $1 \leq j \leq N-1$.

Because an algorithm using a finite state machine produces a periodic sequence, long period sequences are employed, called pseudo-random (PN) sequences, for synchronization patterns. A maximal-length pseudo-random binary sequence may be readily generated using finite (Galois) field mathematics. It may be shown that a full period correlation function of maximal-length sequences generated by linear feedback shift registers substantially satisfy the properties above.

For example, the period, N, of pseudo-random number sequences generated by an LFSR consisting of m-bit registers is equal to that of maximum linearly recurring sequences, $2^m-1$. That is, an identical set of pseudo-random numbers is generated repeatedly for every period of $N=2^m-1$. In one full period, N, a binary sequence contains exactly $2^{m-1}$ ones, and $2^{m-1}-1$ zeroes. Moreover, the correlation function is approximately N for zero delay, and approximately $-1/N$ at all other times. For large N, the above randomness properties substantially are satisfied. Although the present invention employs an LFSR with a PN sequence of length N=15, m may be of any positive, non-zero integer value.

It will be appreciated that a synchronization pattern may be generated by a variety of techniques, and the technique for generating the synchronization pattern employed should not be construed as limiting the scope of the invention. For example, the synchronization pattern may be generated by a Fibonacci implementation LFSR, a Galois implementation, or any software techniques, electronic techniques, or a combination of software and electronic techniques to produce a pseudo-random number sequence with the described randomness properties, or similar bit sequence that is uniquely identifiable from the information data.

In one embodiment, when performing initial lock-up, the receiver (e.g., watch 101) receives incoming data and collects the synchronization bits 431 from each received segment. The collected synchronization bits 431 are then recombined and correlated with local synchronization pattern data that corresponds to the transmitted synchronization pattern. The synchronization bits of the incoming segments are compared by convolving each bit of the incoming synchronization pattern with a substantially identical local synchronization pattern. At some point, the synchronization bits of the incoming segments will correlate with the local synchronization pattern data into a correlation peak, thereby identifying a 16-segment frame. In this manner, the beginning and end (the frame boundaries) of each frame are identified.

In this embodiment, local synchronization pattern data within watch 101 may have been stored in a component within watch 101. In another embodiment, watch 101 might contain components capable of generating the necessary synchronization pattern data.

Figure 6:
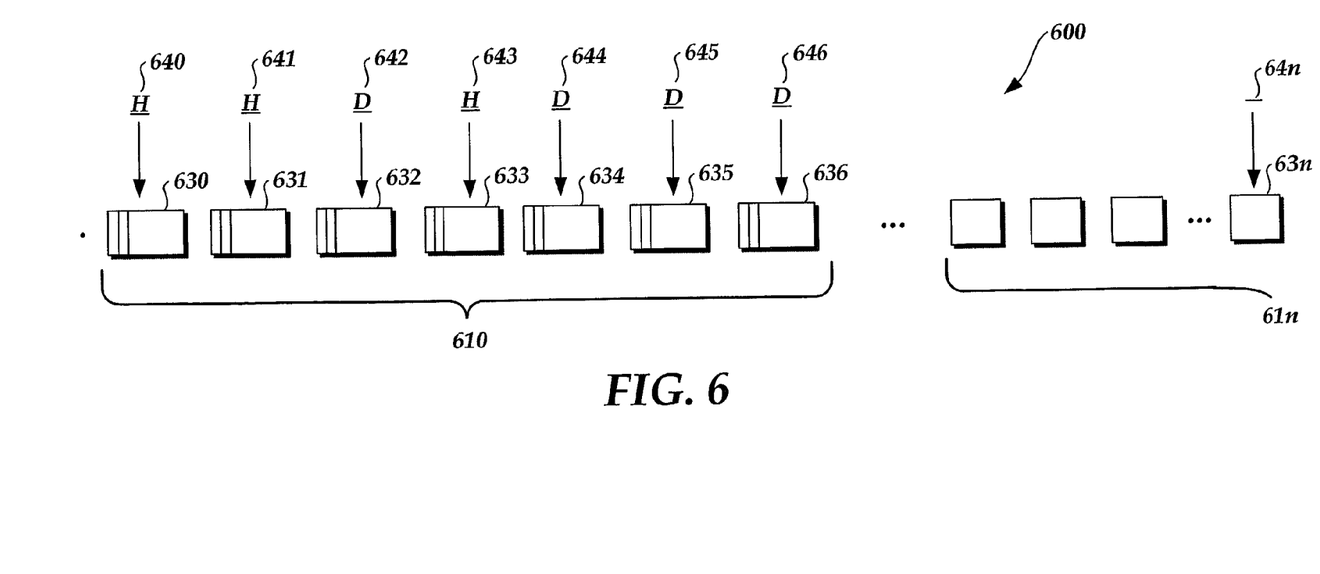
FIG. 6 is still another graphical representation of a data construct or format for a data frame according to one embodiment of the present invention.

FIG. 6 is a graphical representation of a data construct or format used in transmissions by a communications system implementing the present invention to identify where within data stream 600 the received segments are located. Illustrated in FIG. 6 are several segments 630–636. In this illustration, for simplicity, a frame 610 includes seven segments. Each segment (630–63n) includes a frame index bit (640–64n) that is part of a frame index distributed over each segment in frame 610.

In one embodiment, an effective error correcting code may be used to lessen the effects of potential loss during data transmission. The error correcting code employed may be a forward error correcting code, and include a number of bits equal to the number of segments included in the frame. In this embodiment, each bit is either an information bit or a redundant bit (see FIG. 4 and discussion) used to establish the current segment number (divided by 16). In one example, the distributed frame index code is protected with a Hamming code, so that the distributed frame index can be used with a high degree of confidence. A Hamming code is able to protect an information signal from a single error on the channel by adding redundant bits to the signal. In FIG. 6 the Hamming code is a (7,4) Hamming code including 4 bits of information (642, 644, 645, 646) and three parity bits (640, 641, 643), also known as redundant bits.

In this particular embodiment, each sequence of bits (information bits plus redundant bits) is called a code word. In one example, the first redundant bit (640) is chosen so that the sum of ones in the first three information bits (642, 644, and 646) plus the first redundant bit (640) amounts to an even number. (This calculation is called a parity check, and the redundant bit is called a parity bit.) The second parity bit (641) is chosen so that the sum of the ones in the middle three information bits (642, 645, 646) plus the second parity bit (641) is even, and the third parity bit (643) is chosen so that the sum of ones in the last three information bits (644, 645, and 646) and the last parity bit (643) is even.

The Hamming code can correct a single channel error by recomputing the parity checks. A parity check that fails indicates an error in one of the positions checked, and the two subsequent parity checks, by process of elimination, determine the precise location of the error. Therefore, the Hamming code can correct any single error that occurs in any of the seven positions. If two or more errors occur, however, the decoder may choose the wrong code word, or in the alternative, allow the component decoding the data stream to identify the stream as corrupt.

In another embodiment, a (15,11) Hamming code padded with an extra bit to achieve an (16,11) extended Hamming code could be used. The extended Hamming code scheme maintains a distance of 4 and allows synchronization from 16 segments. Synchronization can be obtained in the presence of noise, as well as in any continuous stream of data with virtually no gaps. For example, the present invention may be employed for use in synchronization in disk drives or across a communications bus to provide high performance without data loss.

Additionally, the (16,11) extended Hamming code allows segment numbers to be computed when the 16 segments captured are not from the same 16-group of segments. This may be accomplished using a split bit field in the count pattern in conjunction with a known offset value. In short, once the frame boundaries are identified using the distributed synchronization pattern (as described in conjunction with FIG. 5), the receiver can then identify which particular frame or frames have been received from the frame index bits of the several segments within each frame (as described in conjunction with FIG. 6).

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method of providing a synchronization pattern for use in a communications system comprising the steps of:
   generating a synchronization pattern;
   distributing the synchronization pattern over a segmented information signal, wherein the distributed synchronization pattern defines boundaries between groups of segments in the segmented information signal; and
   distributing a segmented index over a particular group of segments in the segmented information signal, the segmented index distinguishing the particular group of segments from other groups of segments.

2. The method of claim 1, wherein the synchronization pattern is at least one of a random pattern, a pseudo random pattern, and a periodic function.

3. The method of claim 1, wherein the synchronization pattern is produced by a linear feedback shift register (LFSR).

4. A method for communication stream synchronization in a communications receiver comprising the steps of:
   receiving a segmented information signal, wherein the segmented information signal includes a distributed synchronization pattern and a distributed frame index;
   collecting the distributed synchronization pattern from the segmented information signal;
   collecting the distributed frame index from the segmented information signal;
   correlating the collected distributed synchronization pattern with a known synchronization pattern, wherein the correlation defines boundaries for groups of segments in the segmented information signal; and
   evaluating the collected distributed frame index, to identify which group of the groups of segments in the segmented information signal has been received.

5. The method of claim 4, wherein the synchronization pattern is a selected one from a group including a random pattern, a pseudo random pattern, and a periodic function.

6. The method of claim 5, wherein the synchronization pattern is produced by a linear feedback shift register (LFSR).

7. The method of claim 4, wherein the distributed frame index includes an error correcting code.

8. The method of claim 7, wherein the error correcting code is produced using a Hamming code.

9. A system for providing a synchronization pattern for use in a wireless communications system comprising:
   a transmitter configured to transmit information over a wide area on a predetermined schedule;
   a mobile device including a receiver, the receiver being configured to receive the transmitted information; and
   a broadcast signal, transmitted by the transmitter and including a segmented information signal that further includes a distributed synchronization pattern and a distributed frame index wherein the distributed synchronization pattern defines boundaries between groups of segments in the segmented information signal and wherein the distributed frame index identifies a particular group of segments in the segmented information signal,
   wherein each segment of the segmented information signal further comprises:
      a header, including one or more marker bits, a portion of the distributed synchronization pattern, and a portion of the distributed frame index; and
      a payload, including data.

10. The system of claim 9, wherein the distributed synchronization pattern is at least one of a random pattern, a pseudo random pattern, and a periodic function.

11. The system of claim 10, wherein the synchronization pattern is produced by a linear feedback shift register (LFSR).

12. The system of claim 9, wherein the distributed frame index includes an error correcting code.

13. The system of claim 12, wherein the error correcting code is produced using a Hamming code.

14. A method of providing and receiving a synchronization pattern for use in a wireless communications system comprising the steps of:
   generating a synchronization pattern;
   distributing the synchronization pattern over a segmented information signal, wherein the distributed synchronization pattern defines boundaries between groups of segments in the segmented information signal;
   generating a segmented index;
   distributing the segmented index over the segmented information signal, wherein the segmented index identifies a particular group of segments in the segmented information signal;
   transmitting the segmented information signal over a wireless medium;
   receiving at least a portion of the segmented information signal;
   collecting the distributed synchronization pattern from the received segmented information signal;
   collecting the distributed segment index from the received segmented information signal;
   correlating the collected distributed synchronization pattern with a known synchronization pattern, wherein the correlation defines boundaries for groups of segments in the segmented information signal; and
   evaluating the collected distributed segment index to identify which group of the groups of segments in the segmented information signal has been received.

15. The method of claim 14, wherein the synchronization pattern is at least one of a random pattern, a pseudo random pattern, and a periodic function.

16. The method of claim 14, wherein the synchronization pattern is produced by a linear feedback shift register (LFSR).

17. The method of claim 14, wherein the segmented index includes an error correcting code.

18. The method of claim 17, wherein the error correcting code comprises a Hamming code.

19. A computer-readable medium encoded with a data structure for communication stream synchronization in a communications system, the data structure comprising a plurality of segments of data, wherein each segment includes at least two data fields, a synchronization pattern field and an index field, wherein the synchronization pattern field includes a portion of a synchronization pattern that is distributed over each segment of a segmented information signal, wherein the distributed synchronization pattern defines boundaries between groups of segments in the segmented information signal synchronization pattern field and wherein the index field includes a portion of a segmented index that is distributed over a particular group of segments in the segmented information signal, wherein the segmented index distinguishes the particular group of segments from other groups of segments.

20. The computer-readable medium encoded with the data structure of claim 19, wherein the synchronization pattern is a selected one from a group including a random pattern, a pseudo random pattern, and a periodic function.

21. The computer-readable medium encoded with the data structure of claim 19, wherein the synchronization pattern is produced by a linear feedback shift register (LFSR).

22. The computer-readable medium encoded with the data structure of claim 19, wherein the index includes an error correcting code.

23. The computer-readable medium encoded with the data structure of claim 19, wherein the error correcting code is produced using a Hamming code.

* * * * *

UNITED STATES PATENT AND TRADEMARK OFFICE
CERTIFICATE OF CORRECTION

PATENT NO. : 6,970,465 B2 Page 1 of 1
APPLICATION NO. : 10/046653
DATED : November 29, 2005
INVENTOR(S) : Karr It is certified that error appears in the above-identified patent and that said Letters Patent is hereby corrected as shown below:

| COLUMN | LINE | ERROR |
|---|---|---|
| 5 | 33 (Approx.) | Delete "F(0)N, and" and insert -- F(0) = N, and --, therefor. |

Signed and Sealed this

Twenty-eighth Day of November, 2006

JON W. DUDAS
*Director of the United States Patent and Trademark Office*

UNITED STATES PATENT AND TRADEMARK OFFICE
CERTIFICATE OF CORRECTION

PATENT NO.        : 6,970,465 B2                                               Page 1 of 1
APPLICATION NO. : 10/046653
DATED             : November 29, 2005
INVENTOR(S)       : Karr It is certified that error appears in the above-identified patent and that said Letters Patent is hereby corrected as shown below:

In column 6, line 35, delete "code,and" and insert -- code and --, therefor.

Signed and Sealed this

Seventeenth Day of November, 2009

David J. Kappos
*Director of the United States Patent and Trademark Office*